United States Patent [19]
Caillat et al.

[11] Patent Number: 5,101,195
[45] Date of Patent: Mar. 31, 1992

[54] DISCRIMINATING EARTHQUAKE DETECTOR

[75] Inventors: Kenneth D. Caillat, Zephyr Cove, Nev.; David E. Orlinsky, Los Angeles, Calif.

[73] Assignee: Quakeawake Corporation, Calabasas, Calif.

[21] Appl. No.: 414,112

[22] Filed: Sep. 28, 1989

Related U.S. Application Data

[63] Continuation-in-part of Ser. No. 285,199, Dec. 15, 1988, Pat. No. 5,001,466.

[51] Int. Cl.⁵ .............................................. G08B 21/00
[52] U.S. Cl. ...................................... 340/690; 73/654; 340/540
[58] Field of Search ................ 340/690, 540; 367/180, 367/188, 12; 73/651, 654

[56] References Cited

U.S. PATENT DOCUMENTS

| | | | |
|---|---|---|---|
| 3,186,237 | 6/1965 | Forrest | 73/517 R |
| 4,300,135 | 11/1981 | Korn et al. | 340/690 |
| 4,300,220 | 11/1981 | Goff et al. | 367/188 |
| 4,408,196 | 10/1983 | Freeman | 340/690 |
| 4,473,768 | 9/1984 | Kerr et al. | 73/517 B |
| 4,616,320 | 10/1986 | Kerr et al. | 340/690 |
| 4,689,997 | 9/1987 | Windisch | 340/690 |
| 4,764,762 | 8/1988 | Almour | 340/690 |

FOREIGN PATENT DOCUMENTS 1160345  6/1985  U.S.S.R. .............................. 367/180

*Primary Examiner*—Glenn R. Swann, III
*Attorney, Agent, or Firm*—Arthur Freilich; Robert D. Hornbaker; Leon D. Rosen

[57] ABSTRACT

An earthquake detector is provided for mounting on a structural member of a building or the like, which is resistant to false alarms arising from door slamming, traffic, running, sonic booms, etc., and yet which is sensitive to earthquakes and especially to P-waves which often precede destructive S-waves. The apparatus includes a motion detector for generating an alarm signal, which is responsive only to vibrations below a frequency of about 14 Hz, to avoid false alarms from non-earthquake vibrations. The detector can include a cantilevered beam device with a weight on its free end, and which generates a signal as the weight moves up and down, and a filtering circuit that passes primarily signal components of a frequency between 3 and 14 Hz. The beam device preferably is highly damped so its response is only slightly higher at its resonance frequency than at other frequencies.

2 Claims, 4 Drawing Sheets

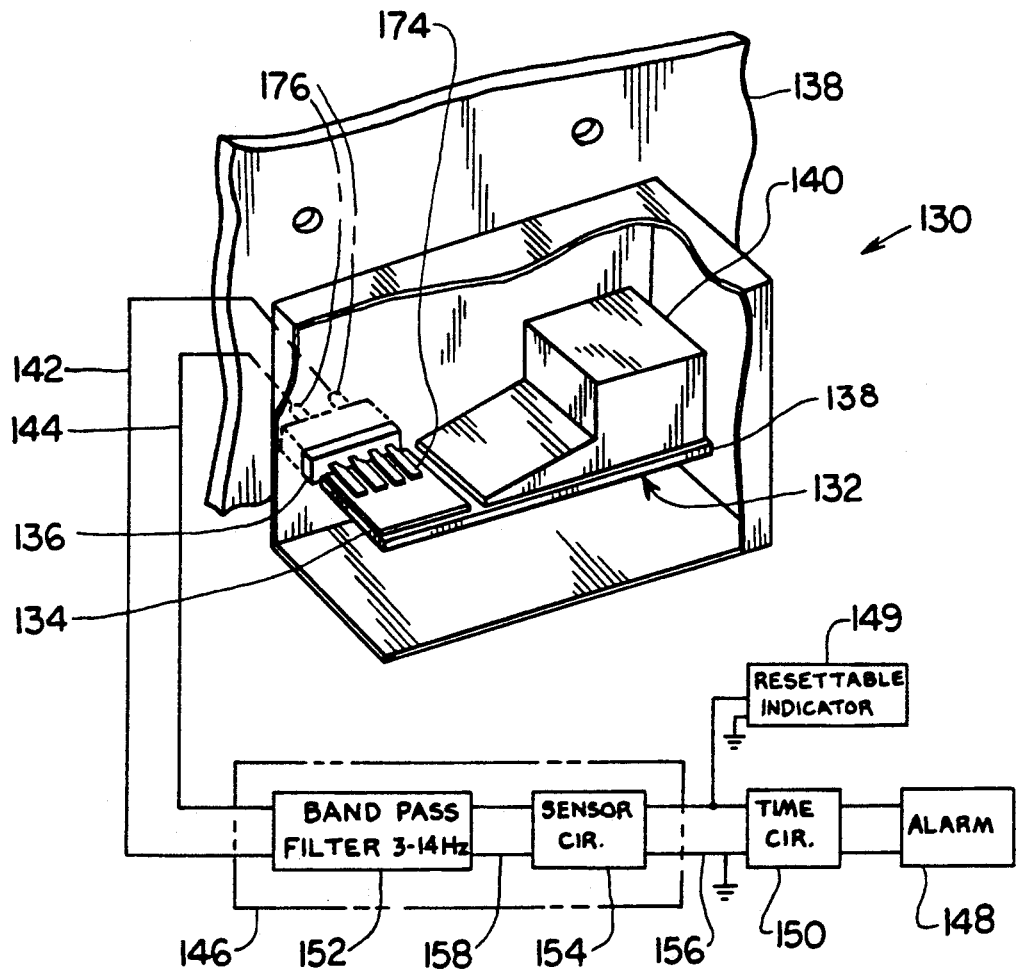
FIG. 8
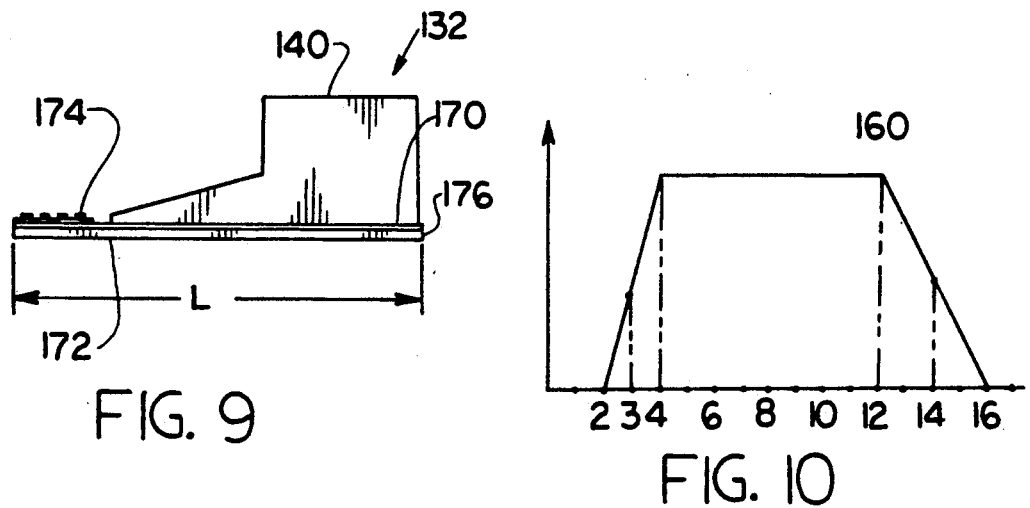
FIG. 9
FIG. 10

DISCRIMINATING EARTHQUAKE DETECTOR

CROSS-REFERENCE TO RELATED APPLICATION

This is a continuation-in-part of U.S. patent application Ser. No. 07/285,199 filed Dec. 15, 1988 on Earthquake Detector by Orlinsky and Caillat, now U.S. Pat No. 5,001,466, issued Mar. 9, 1991.

BACKGROUND OF THE INVENTION

An earthquake detector which can detect the occurrence of noticeable earthquakes is useful to awake persons who will sleep through an earthquake shock, and to shut off gas and/or electricity to minimize the possibility of fires. An earthquake detector can be attached to a main structural component of a building or other structure so that it shakes or vibrates when the building vibrates, to generate a signal that sets off an alarm. However, it is important that the detector not give a false alarm in the event of other common non-earthquake vibrations such as slamming of a door, running in the building, nearby heavy traffic, or a sonic boom. An earthquake detector which could generate a signal upon the detection of a moderate earthquake, but which was resistant to the generation of false alarms, would be of considerable value.

Earthquakes produce P (for primus)-waves and S (for secundus)-waves. The P-waves travel at a rate of about 5.6 km per second (about 3.5 miles/sec.), while the S-waves travel at a velocity a little more than half that of the P-waves (about 1.8 miles/sec.). The P-waves are less energetic than the S-waves, but can serve as a warning to the imminent arrival of more powerful S-waves, if a detector was especially sensitive to a P-wave. A relatively simple apparatus which was especially sensitive to P-waves, would be of considerable use in warning persons of impending large shock waves.

SUMMARY OF THE INVENTION

In accordance with one embodiment of the present invention, an apparatus is provided for detecting earthquakes, which is resistant to false alarms and which is especially sensitive to vertical vibrations. The apparatus includes a vibration detector which generates a signal indicating the presence of an earthquake shock, the detector being responsive only to vibrations below a certain frequency such as about 14 Hz, to avoid detection of vibrations from non-earthquake origins. The detector is preferably sensitive only to vibrations above a certain frequency such as 3 Hz, to avoid false alarms from slow movement of the earth or motion of the building as from heat. The detector can include a motion detector whose output is delivered through a filtering circuit that passes only signal components within a certain band of frequencies.

The vibration detector can include a substantially horizontal cantilevered beam with a weight on its free end. This device is sensitive primarily to P-waves, which can indicate the imminent approach of the more powerful S-waves. The beam can include a strip of piezoelectric material which generates a voltage which is elongated or compressed. The beam is damped, so its output for a given level of vibrations is relatively constant even for frequencies close to the resonant frequency of the beam.

The novel features of the invention are set forth with particularity in the appended claims. The invention will be best understood from the following description when read in conjunction with the accompanying drawings.

BRIEF DESCRIPTION OF THE DRAWINGS

FIG. 8 is a partially perspective and partially block view of an earthquake detector constructed in accordance with another embodiment of the invention.

FIG. 9 is a side elevation view of the beam device of the detector of FIG. 8.

FIG. 10 is a simplified graph showing the amplitude vs. frequency sensitivity of the detector of FIG. 8.

DESCRIPTION OF THE PREFERRED EMBODIMENTS

Figure 1:
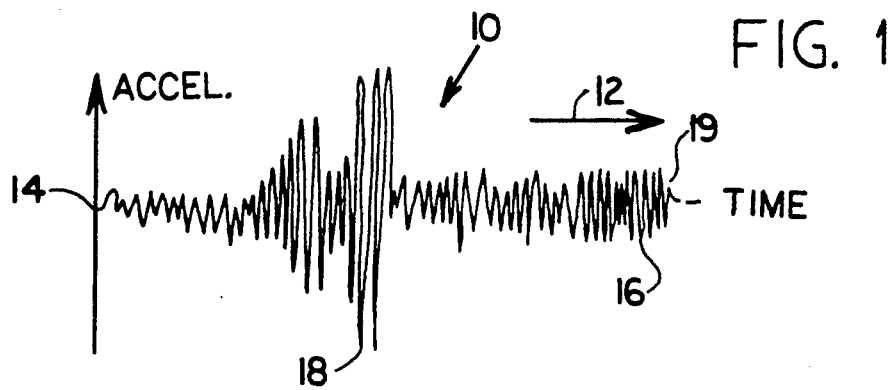
FIG. 1 is a simplified graph indicating variation of the acceleration magnitude of earthquake shocks with time.

FIG. 1 is a graph 10 that indicates waves produced by an earthquake, indicating the variations in force or acceleration level with time, at a location spaced a considerable distance from the epicenter of the earthquake, such as 20 miles away. The graph indicates the variation in acceleration level that might be recorded on graph paper moving in the direction of arrow 12 away from a recording stylus at the location 14. P-waves 16 are the first to arrive. Several seconds later, S-waves 18 arrive, which produce local accelerations about four times the magnitude of the P-waves. Both waves originate at the same time at the epicenter, but the P-waves are compression waves that travel at about 5.6 km/sec while the S-waves are lateral displacement waves that travel about one-half as fast. At a distance of about 20 miles (about 32 kilometers) from the epicenter, the leading edge 19 of the P-waves arrive about six seconds after the beginning of the earthquake, while the S-waves arrive about six seconds later. Of course, the actual velocities depend upon soil and other conditions.

The devices to be described below, are able to give warning of the imminent arrival of earthquake shocks of potentially destructive levels, by detecting the P-waves of substantial magnitude that indicate the imminent arrival of S-waves of larger and potentially destructive levels. A warning time of several seconds is sufficient for people to move away from earthquake-dangerous areas of a building to safer areas, such as away from windows that might shatter and to locations under door frames where they are safer from falling debris. Of course, the number of seconds of warning given to a person depends on his distance from the epicenter of the earthquake. However, since destructive earthquakes generally cause destruction over wide areas, most of the affected people can receive at least several seconds of warning. Thus, by detecting the P-waves which typically arrive several seconds before the more destructive S-waves, applicant provides several seconds of warning to people of impending potentially destructive earthquake shocks.

Figure 2:
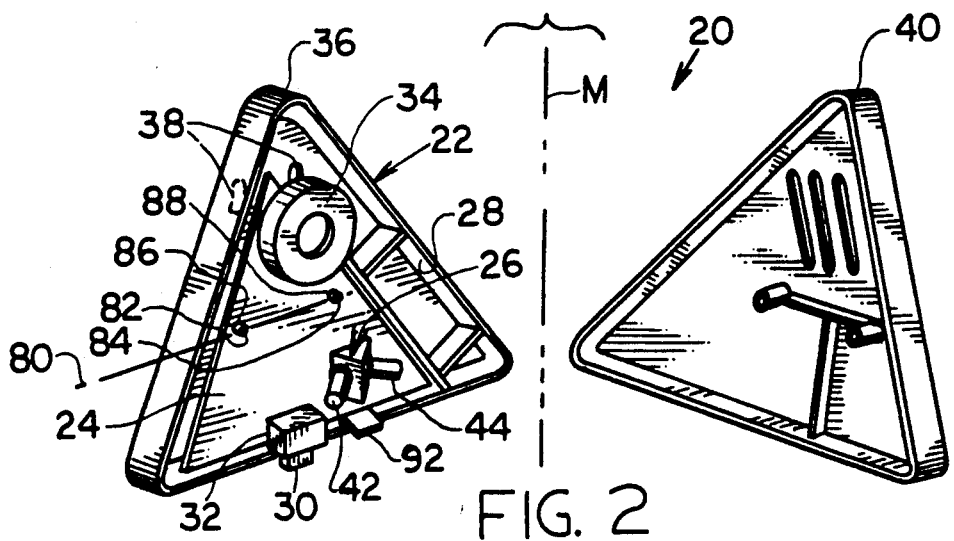
FIG. 2 is a perspective view of an earthquake detector constructed in accordance with one embodiment of the present invention with the cover removed.

FIG. 2 illustrates an earthquake detector 20 which can detect P-waves and S-waves to sound an audible alarm that warns of the imminent arrival of potentially destructive earthquake shocks and/or warns of the actual arrival of such shocks so as to awaken people who would not be awakened by the actual potentially destructive shocks. The detector includes a housing 22 that can be attached to a main structural member M of a building such as a structural column or well-supported stud, which will shake when the earth shakes. A circuit board 24 is mounted on the housing and carries a shake detector 26. A battery compartment 28 holds a battery that energizes the device. A person can turn on the device by operating a slider knob 30 of a switch 32. When a strong shock is detected, an audible alarm 34 is energized. The housing includes a main portion 36 with mounting holes 38, and a cover portion 40 that is snapped onto the main portion.

Figure 3:
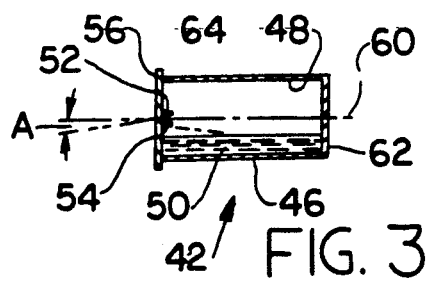
FIG. 3 is a sectional side view of a mercury switch of the detector of FIG. 2.
Figure 4:
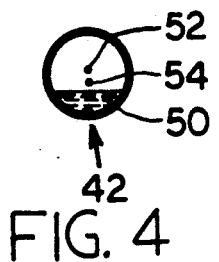
FIG. 4 is a sectional end view of the switch of FIG. 3.
Figure 5:
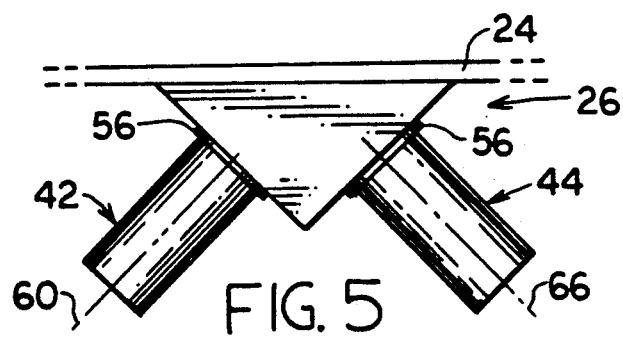
FIG. 5 is a plan view of a portion of the detector of FIG. 2.

FIGS. 3-5 illustrate details of the shock detector 26. The shock detector includes two mercury-type switches 42, 44 that are commonly available as tilt sensors. Each switch such as 42 includes a cylindrical container 46 forming a chamber 48 that holds a quantity of electrically conductive liquid 50 such as mercury. A pair of electrodes 52, 54 lie at the inner end 56 of the chamber. When the container accelerates in a direction along its axis 60, the conductive liquid 50 "sloshes", and can move to a position wherein it contacts both electrodes 52 and 54 to electrically connect them. The mercury-type switch is sensitive primarily to acceleration parallel to its axis 60, and is relatively insensitive to accelerations perpendicular to its axis. The amount of acceleration required to close the switch largely depends upon the distance of the uppermost electrode 52 from the surface of the conductive liquid. The sensitivity can be varied by tilting the switch. For example, tilting the switch by an angle A wherein its inner end 56 moves downwardly with respect to its outer end 62, causes the surface of the liquid to assume the orientation indicated at 64, so there is a smaller distance between the surface of the liquid and the upper electrode 52, and the switch will close at a smaller acceleration level.

The direction of shaking of the earth depends to a large extent upon the direction of the epicenter of the earthquake from the building which contains the earthquake detector. As mentioned above, the switch 42 is sensitive primarily to acceleration along its axis 60. To provide about the same sensitivity to acceleration in any horizontal direction, applicant provides the second mercury-type switch 44 and orients it so its axis 66 along which it is primarily sensitive to accelerations, is perpendicular to the axis 60 of the other switch 42. It should be noted that shaking of the ground in any direction will cause shaking of a building in all directions, although not necessarily equally in all directions. The largest component of a P-wave is vertical.

Figure 7:
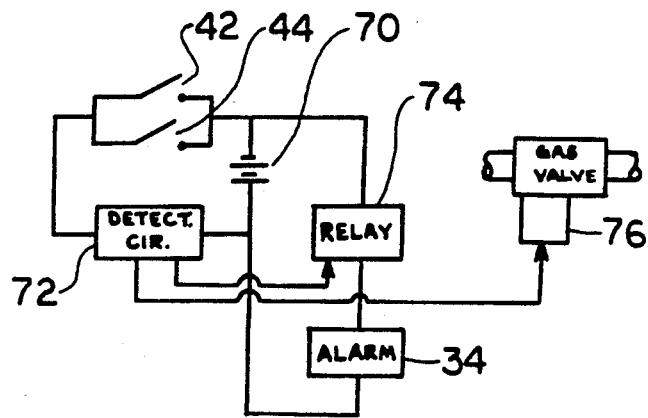
FIG. 7 is a simplified circuit diagram of the detector of FIG. 2, and also showing one way in which it can be used.

FIG. 7 is a simplified diagram of circuitry mounted primarily on the circuit board 24, which uses the switches 42, 44. The two switches 42, 44 are connected in parallel, and are connected in series with a voltage source 70 and a detector circuit 72. When the detector circuit detects a closing of one or both of the switches, it closes a relay 74 which connects the voltage source 70 to the alarm 34. Where the epicenter of the earthquake is many miles away, the alarm will begin sounding several seconds before the arrival of the potentially destructive S-waves. Even if the apparatus detects only the destructive S-waves, sounding of the alarm is useful to persons who might otherwise sleep through the earthquake and not take steps to protect themselves and others. The detection circuit 72 can also be used to automatically operate devices such as a turnoff mechanism 76 that turns off a gas valve to avoid gas explosions that are a threat after a major earthquake.

It is important to enable adjustment of the sensitivity of the earthquake detector. If the sensitivity is too great, the apparatus is more likely to be set off by extraneous events such as slamming of doors or running in a house, and the alarm will sound when minor earthquakes are detected which are not potentially destructive. When a person first installs the earthquake detector, he usually wishes to have relatively high sensitivity, which gives him assurance that the device is "working" by sounding an alarm when the more common minor earthquakes occur. That is, if a person "feels" the ground shaking due to a minor earthquake, but the earthquake detector does not sound an alarm, the person may be disappointed and wonder if the apparatus is working. After a while, the person is more likely to want less sensitivity to avoid disturbance from the alarm when there is no imminent danger.

Figure 2A:
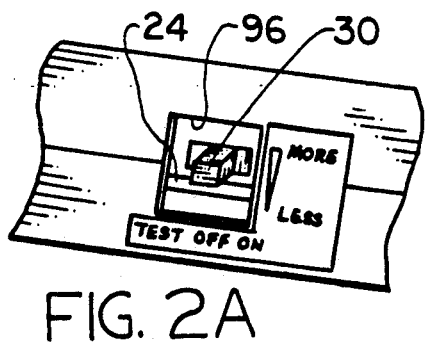
FIG. 2A is a partial bottom perspective view of the detector of FIG. 2.
Figure 6:
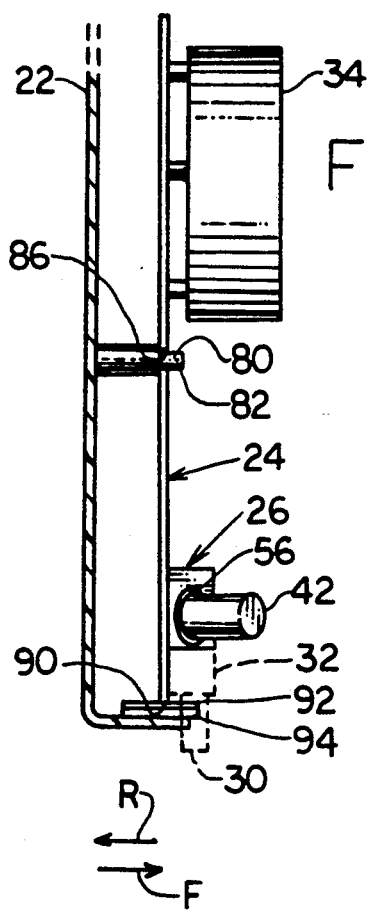
FIG. 6 is a sectional side view of a portion of the detector of FIG. 2

As shown in FIG. 6, the circuit board 24 which holds the shock detector 26 and its two perpendicular mercury-type switches 42, 44, is pivotally mounted on the housing 22 to permit pivoting about a substantially horizontal axis 80. The housing includes two posts 82, 84 (also FIG. 2) that project through holes 86, 88 in the circuit board, the holes being larger than the posts to permit pivoting of the board on the posts. The lower edge 90 of the board presses against a flexible sheet 92 of felt held by double sided adhesive tape 94 to the housing. The knob 30 of switch 32 extends downwardly through a hole 96 (FIG. 2A) in the housing to permit a person to tilt the circuit board and therefore the shake detector 26 thereof, with the felt 92 holding the circuit board in any tilt position it is moved to.

Tilting of the circuit board affects the sensitivity of the mercury-type switches 42, 44. When the bottom of the board is tilted forward in the direction F, the mercury in the mercury-type switches moves towards the inner ends 56 of the switches which increases their sensitivity. Similarly, movement of the bottom of the circuit board in the rearward direction R reduces the sensitivity of the switches. The mounting arrangement of the switches causes the sensitivity of each of them to increase or decrease for a particular direction of tilt of the circuit. A person may first tilt the bottom of the circuit board forward for maximum sensitivity. If he finds that the alarm is tripped when there are relatively mild earthquakes that he does not wish to be informed about, he may move the bottom of the circuit board back by perhaps one quarter of the total 1 cm movement. He may continue such movement until he finds that the alarm is not set off by earthquakes too mild to be of concern to him. He may also take into account any setting off of the alarm by other phenomena such as slamming of doors. In Southern California, most potentially destructive earthquakes occur during morning sleeping hours, when the alarm is unlikely to have been set off by extraneous factors such as slamming of a door or running of people in the house. Tilting of the shock detector 24 is also useful to avoid the effects of the main structural member not being plumb.

FIG. 8 illustrates another earthquake detector 130 which includes a mechanical vibration detecting apparatus formed by a beam device 132 having an inner end 134 with a location thereof rigidly held in position and orientation by a mount 136, and having an outer end 138 that carries a weight 140. The beam device is resilient and extends generally horizontal. The mount 136 includes a bracket 138 that is attached to a main building structural component. When an earthquake occurs, the building and mount 136 vibrate as by moving vertically while the weight 140 tends not to move, and therefore the beam 132 bends. Such bending causes the generation of an electrical signal over conductors 142, 144 to a detecting circuit 146. When the detecting circuit detects an output of the beam device that indicates the occurrence of an earthquake which produces at least a certain level of local acceleration, it sets off an alarm 148 to create an alarm that will wake up and notify people about an earthquake (or perform some other functions such as to shut off of a utility). A timing circuit 150 between the output of the detector circuit in the alarm can be used to turn off the alarm so the alarm sounds for periods of one second that are each followed by periods of silence of one second, to enable a person to hear noise such as persons hollering for help, etc., during the period of silence. After a period such as one minute, the alarm is no longer energized, and the timing circuit resets until another earthquake is detected. A resettable indicator 149 such as an LED (light emitting diode) energized through a latching relay, indicates the detection of an earthquake.

The detection circuit 146 includes a band pass filter 152 which passes primarily frequencies between 3 and 14 Hz, and which block frequencies outside this range. The output of the band pass filter is delivered to a sensor circuit 154 which generates an alarm signal on an output 156 when it senses an output from the band pass filter exceeding a predetermined level which indicates the presence of an earthquake of a least a certain acceleration level.

The band pass filter 152 is useful to avoid false alarms arising from everyday occurrences which are not related to earthquakes but which produce low frequency vibrations. The most common of such occurrences which may vibrate the structural members of a building, are the slamming of a door, traffic especially of large vehicles, running in the building, and sonic booms. Tests show that door slamming and traffic create vibrations primarily in the frequency range of 16 to 48 Hz. Running creates vibrations primarily in the range of 18 to 22 Hz. Sonic booms create vibrations primarily in the range of 14 to 25 Hz. Studies by the California Institute of Technology show that P-waves produce vibrations primarily in the range of 4 to 8 Hz. S-waves produce vibrations primarily in the range of 2 to 6 Hz. Since the frequency of earthquake-caused vibrations is significantly lower than that of the most common non-earthquake local disturbances, applicant is able to avoid false alarms by filtering out frequencies above about 14 Hz.

There are some very low frequency local vibrations, such as caused by heating and cooling of the earth and/or the building. Since vibrations below about 2 Hz are not of considerable significance in detecting earthquakes, applicant blocks out such low frequencies. FIG. 10 is a simplified representation of the amplitude vs. frequency characteristics of the band pass filter, the amplitude representing the percent of the input over lines 142, 144 to the band pass filter 152 that is present in the output 158 of the filter. The graph 160 of FIG. 10 shows that the output or gain of the filter is maximum and substantially constant between 4 and 12 Hz. Below 4 Hz, the gain drops quickly with frequency and is substantially zero at 2 Hz. Above 12 Hz, the gain decreases rapidly and is substantially zero at 16 Hz. It may be said that the filter passes substantial amounts of a signal between 3 and 14 Hz, but with maximum gain between 4 and 12 Hz. Thus, the filter blocks substantially all vibrations from non-earthquake sources whose frequencies are generally above 14 Hz. Still, the filter passes the vibrations of P-waves, which are primarily between 4 and 8 Hz, and most of the vibrations of S-waves, which are primarily between 2 and 6 Hz. Thus, the filter makes the apparatus highly resistant to false alarms.

P-waves vibrate the earth primarily vertically, while S-waves vibrate the earth primarily horizontally. The earthquake detector which includes a horizontal beam with a weight at its end, is primarily sensitive to vertical vibrations, and therefore sensitive primarily to P-waves. As discussed earlier herein, the detection of P-waves is especially useful in detecting the probable approach of the more powerful S-waves, where the epicenter of an earthquake is distant from the building containing the earthquake detector. The sensitivity of an earthquake detector constructed by applicant as shown in FIG. 8, was approximately five times as great to vertical vibrations (P-waves) than to horizontal vibrations (S-waves).

The beam device 132 includes a strip 170 of PZ (piezoelectric) material which generates a voltage when it is compressed or elongated. Instead of allowing bending over a long portion of the beam, applicant rigidizes most of the beam length by a rigid weight 140. This results in beam bending primarily in the region 172. Applicant attaches contacts 174 to the inner end of the beam which contact corresponding contacts 176 on the mount 136, and uses the contacts to connect the inner end of the beam to the mount. Applicant uses a strip 170 of PZ material of five thousandths inch thickness and a length L of 1¾ inches. The weight 140 has a weight of about 0.2 oz. Applicant found that the resonant frequency of the beam device was about 14 Hz, which could result in a large output from the beam device when vibrated near its resonant frequency (e.g., as by a sonic boom), which might lead to a false alarm. To avoid this, applicant damps the beam device, by applying a dampening layer 176 to the lower face of the PZ strip. The dampening layer 176 is constructed of resilient foam of a thickness of about 70 thousandths inch. The dampening layer also results in all of the PZ strip undergoing compression or tension as the beam bends.

The circuitry is set so a predetermined minimum amplitude is required to trip the alarm. Applicant sets this minimum acceleration at 0.005 G (one G equals $32/feet^2$). This is about the minimum acceleration level of low frequency vibrations that people notice. A control (not shown) such as a potentiometer can be used to vary the sensitivity of the apparatus to acceleration (the acceleration to generate an alarm signal), so after they realize the device detects earthquakes, they can set it to detect only moderate to large earthquakes.

Figure 11:
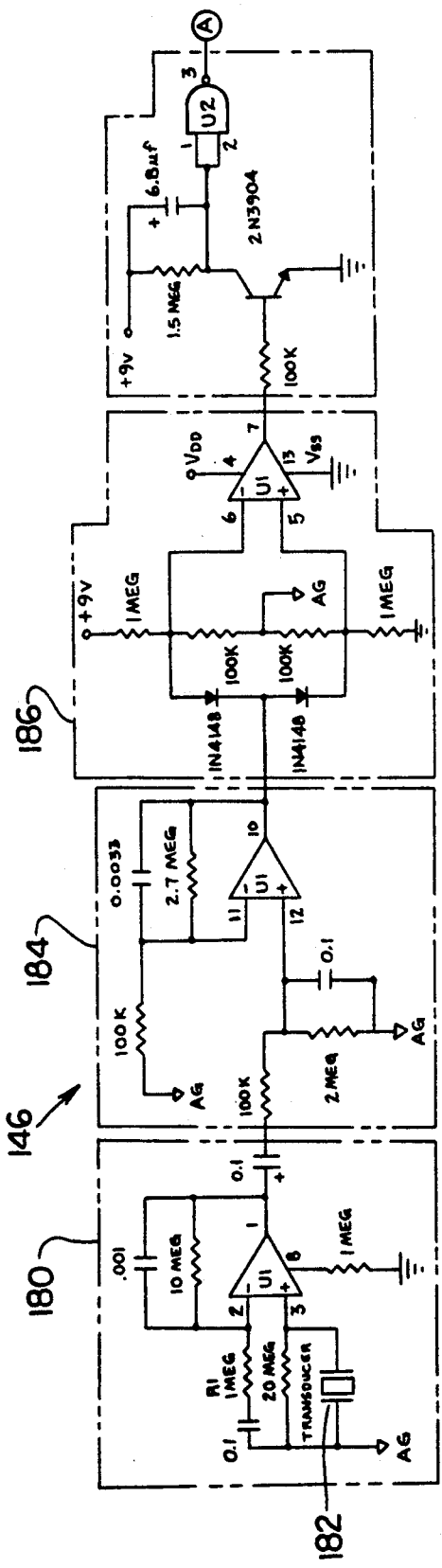
FIGS. 11–13 comprise schematic diagram of the detector of FIG. 8.
Figure 13:
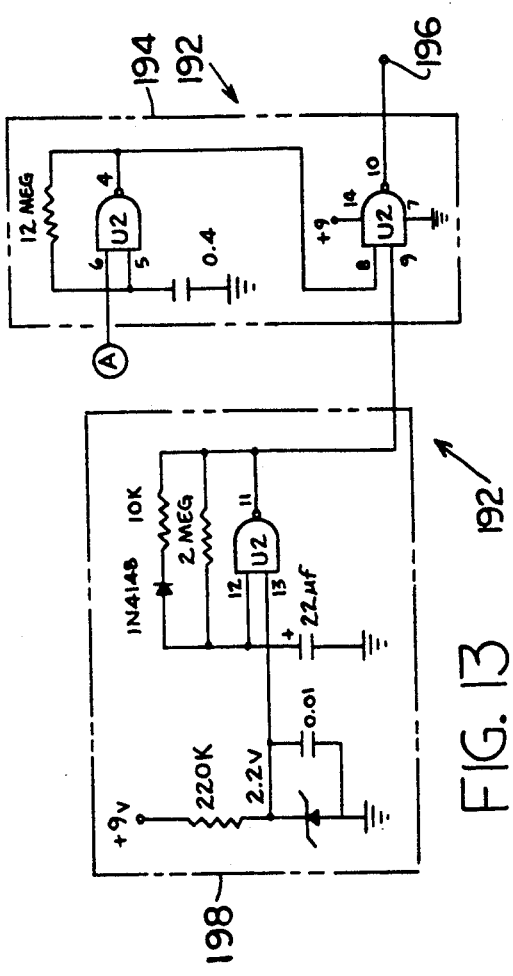
Figure 12:
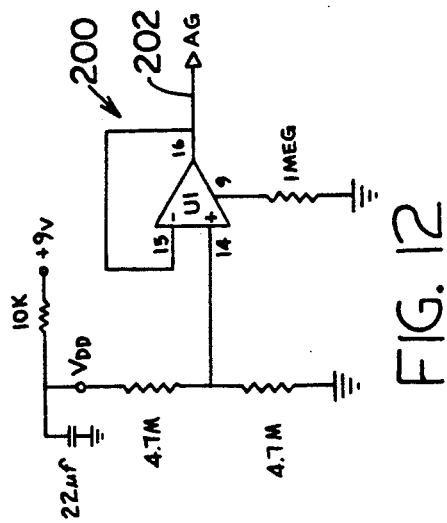

FIGS. 11–13 illustrate details of the detector circuit 146. FIG. 11 shows that the circuit includes a first portion 180 that includes the transducer 182 formed by the PZ strip 170. The circuit portion 180 serves as a preamplifier, and as a single pole low pass filter and a double pole high pass filter. A second portion 184 of the circuit serves as a double pole low pass filter and also adds some gain. A third portion 186 serves as a comparator which compares the absolute values of its input to a preset threshold value, and whose output is 0 or 9 volts. A fourth portion 190 serves as a one shot timer. The output of the fourth portion, labeled "A" is an alarm signal delivered to the input "A" of the circuit 192 of FIG. 13.

The circuit 192 of FIG. 13 includes a portion 194 that serves as the timing circuit 150, with an oscillator having a period of about two second (switches from on to off every second), which continues for a period of one minute. The output 196 is designed to energize an audible alarm that has a PZ driver. The other portion 198 of the circuit of FIG. 13 is a low battery indicator that generates a signal on output 196 to indicate a low battery, in the manner of battery-operated smoke alarms.

The circuit 200 of FIG. 12 generates an artificial ground "AG" on its output 202 that is delivered to points labeled "AG" in the circuit 146 of FIG. 11.

Thus, the invention provides an apparatus for detecting earthquakes, which is resistant to false alarms caused by non-earthquake vibrations. The apparatus includes a vibration detector that can be mounted on a structural member of a building to detect vibrations of it, the detector being responsive only to vibrations below a predetermined frequency of about 14 Hz. The detector can include a cantilevered beam with its inner end held to a mount and its outer end carrying a weight, and which generates signals of amplitudes dependent upon the degree of its bending. With the beam horizontal, the detector is sensitive primarily to vertical oscillations, and therefore sensitive primarily to P-waves to enable an alarm to be set off that indicates the likely approach of powerful S-waves.

Although particular embodiments of the invention have been described and illustrated herein, it is recognized that modifications and variations may readily occur to those skilled in the art and consequently it is intended to cover such modifications and equivalents.

What is claimed is:

1. An earthquake detector that can be mounted on a building that is subject to vibrations from slamming of doors, running in the building, nearby heavy traffic, and sonic booms, comprising:
   a vibration detector for generating an alarm signal upon detecting vibrations of an acceleration level of at least about 0.005 G;
   a mount for supporting said detector on said building;
   said vibration detector including an electromechanical apparatus which generates a substantially frequency independent output proportional to acceleration, and an electrical filter which is connected to the output of said electromechanical apparatus and passes frequencies below 12 Hz while blocking frequencies above about 12Hz, whereby to block false alarms arising from door slamming, traffic, running, and sonic booms.

2. An earthquake detector that can be mounted on a building that is subject to vibration from slamming of doors, running in the building, nearby heavy traffic, and sonic booms, comprising:
   a vibration detector for generating an alarm signal detecting vibrations of an acceleration level of at least about 0.005 G;
   a mount for supporting said detector on said building;
   said vibration detector including an electromechanical apparatus which includes a weight and means for resiliently supporting said weight and generating an output dependent upon movement of said weight, and electrical filter which is connected to the output of said electromechanical apparatus and which passes frequencies below about 12 Hz while blocking frequencies above about 12 , to avoid passing frequencies resulting from slamming of doors, running in the building, nearby heavy traffic, and sonic booms;
   said vibration detector including means for dampening said means for resiliently supporting said weight, whereby to avoid resonances in said mechanical apparatus.

* * * * *